Patented Sept. 26, 1933

1,927,936

UNITED STATES PATENT OFFICE 1,927,936

DERIVATIVES OF 3-NITRO-4-HYDROXY-BENZAMIDE

Winfrid Hentrich, Leverkusen-Wiesdorf, Richard Stroebel, Opladen, and Ernst Tietze, Cologne, Germany, assignors to General Aniline Works, Inc., New York, N. Y., a corporation of Delaware No Drawing. Application August 29, 1930, Serial No. 478,780, and in Germany September 11, 1929

5 Claims. (Cl. 260—124)

The present invention relates to new derivatives of 3-nitro-4-hydroxybenzamide, more particularly it relates to compounds of the probable general formula:

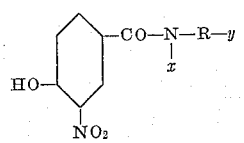

wherein $x$ stands for hydrogen or an alkyl group, R stands for an aromatic nucleus, $y$ stands for an amino-, nitro-, hydroxy-group or for the group $—N=N·R_1$ meaning an aromatic nucleus, and wherein all nuclei may be further substituted, for example, by sulfonic and carboxylic acid groups, alkyl, alkoxy, hydroxyl, the nitro and amino groups.

Our new products are obtainable by causing a 3-nitro-4-acylhydroxy-benzoic acid halide:

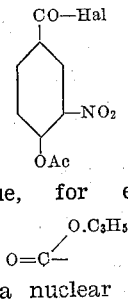

(Ac=acyl residue, for example, $CH_3CO$, $$O=C\diagup^{O.C_2H_5}$$

or the like) or a nuclear substitution product thereof to interact with an aromatic primary or secondary amine which is further substituted either by an amino-nitro- or hydroxy-group, or by causing a nitro-acyl-hydroxy-benzoic acid halide of the kind referred to above to react with an aromatic aminoazo compound.

Depending on the nature of the compound to be condensed the 3-nitro-4-acylhydroxybenzoic acid halide can be caused to react in water, mixtures of organic solvents with water or in organic solvents alone, acid binding agents, such as sodium acetate, sodium carbonate, magnesium oxide, tertiary bases, such as pyridine or dimethylaniline being added, as and when desired. The condensations proceed very smoothly. Already during the reaction a complete splitting off of the O-acyl group takes place.

Our new compounds are colorless to greenish to brown crystalline substances and are valuable intermediate products in the manufacture of dyestuffs.

By treating the new o-nitro-hydroxy compounds thus produced with reducing agents, o-aminohydroxy compounds are obtained, which contain the o-aminophenol grouping in the external position besides containing the azo group or groups capable of azo dyestuff formation respectively.

The following examples illustrate our invention, without limiting it thereto, the parts being by weight:

*Example 1.*—18,8 parts of 1.3-phenylenediamine-4-sulfonic acid are dissolved in 500 parts of water with the addition of sodium carbonate to form a neutral solution. The solution is heated to 40° C., 30 parts of crystalline sodium acetate are added and 24.3 parts of 4-acetoxy-3-nitrobenzoyl chloride (this compound, hitherto unknown, is obtainable by the interaction of 3-nitro-4-acetoxybenzoic acid with thionyl chloride; a colorless crystalline mass, melting at 55° C.) are introduced with brisk stirring. The mixture is then heated quickly to 60° C. and stirred for a further half hour at this temperature; the 4-acetoxy-3-nitrobenzoyl chloride thereby quickly disappears and the solution is colored a deep yellow. On cooling the reaction product of the formula:

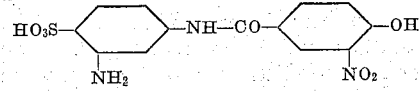

is precipitated by means of dilute hydrochloric acid and filtered by suction. After the customary working up, the new compound is obtained as an almost colorless powder, which dissolves in sodium carbonate solution with a deep yellow coloration and is capable of being diazotized. By the reduction of this compound, for example, with iron and acetic acid, the corresponding diamino compound is obtained.

In an analogous manner a condensation product possessing similar properties is obtained by causing interaction with 4-acetyloxy-3-nitrobenzoyl chloride of 1.4-phenylenediamine-2-sulfonic acid instead of the 1.3-phenylenediamine-4-sulfonic acid. The compound of the formula:

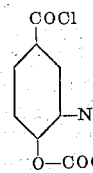

(Journ. Chem. Soc. 127, 2646)

can likewise be employed with similar results instead of the 3-nitro-4-acetoxybenzoyl chloride.

When in a similar manner 3-nitro-4-acetoxybenzoyl chloride is caused to react with the sodium salt of 2.5-diamino-4'-hydroxy-1.1'-diphenylsulfone-3'-carboxylic acid or with the sodium salt of 4.4'-diaminodiphenyl-3-sulfonic acid, the respective condensation products precipitate even during the reaction as difficultly soluble precipitates and in a pure state. Compounds of the formulæ:

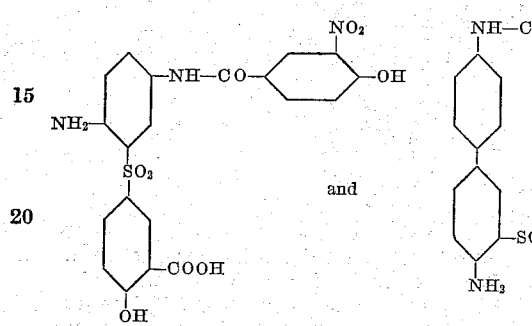

are thus obtained.

*Example 2.*—31.9 parts of 1-amino-8-naphthol-3.6-disulfonic acid are covered with 500 parts of water and caused to dissolve by the addition of 10.6 parts of calcined sodium carbonate. After the addition of 30 parts of crystalline sodium acetate, 24.3 parts of 4-acetoxy-3-nitrobenzoyl chloride are introduced at 40° C. with brisk stirring; the mixture is quickly heated to 55° C. and stirred for a further half hour at this temperature. The solution thereby acquires a strong yellow coloration and assumes acid reaction to litmus. On cooling the resulting condensation product of the following formula:

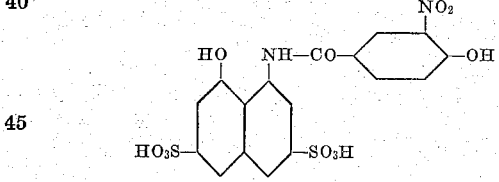

is salted out and filtered by suction. It is a yellow powder, which dissolves with difficulty in water, readily in dilute sodium carbonate with a deep yellow coloration and is indifferent towards nitric acid.

Products similar in some respects but somewhat more difficultly soluble, which separate even during the reaction, can be obtained according to the process described above by employing instead of 1-amino-8-naphthol-3.6-disulfonic acid the 2-amino-5-naphthol-7-sulfonic acid, the 2-amino-8-naphthol-6-sulfonic acid or the 1-amino-8-naphthol-4-sulfonic acid.

The reaction of secondary amines takes place as follows:

As an example, 34,7 parts of 1-ethyl-amino-8-naphthol-3.6-disulfonic acid are dissolved to a neutral solution by means of the corresponding quantity of sodium carbonate, 30 parts of crystallized sodium acetate are added and 24.3 parts of 4-acetoxy-3-nitrobenzoyl chloride are then introduced at 50° C. with good stirring. The mixture is heated for a further half hour at 60° C. and is then allowed to cool. The condensation product formed is very readily soluble, it is isolated by evaporation of the weakly acid solution.

Aminobenzoylated aminonaphthol sulfonic acids or in general aminonaphtholsulfonic acids, containing reactive amino groups in the heteronuclear side chains can likewise be caused to react readily with 4-acyloxy-3-nitrobenzoyl halides. Thus, for example, from 4-acetoxy-3-nitrobenzoyl chloride and 2-(3'-aminobenzoyl)-amino-5-naphthol-7-sulfonic acid, a condensation product is obtained, which separates well and which has the following constitution:

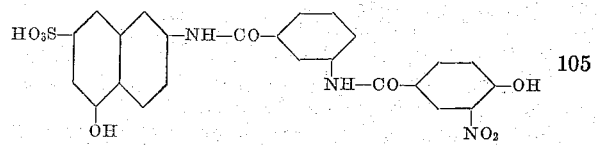

*Example 3.*—23.4 parts of 2-nitro-4-aminophenol-6-sulfonic acid are dissolved in 500 ccm. of water to a neutral solution with the addition of sodium carbonate, 30 parts of crystalline sodium acetate are added and 24.3 parts of 4-acetoxy-3-nitrobenzoyl chloride are introduced in one addition at 45° C. with brisk stirring. The liquid is at once colored deep yellow and lustrous gold colored plates soon separate; very quickly and particularly, when heating for a short time to 60° C., they extend throughout the whole contents of the vessel in the form of a thick magma. Stirring is continued for a further half hour at 60° C. and the new product is then filtered by suction. The condensation product thus obtained is already completely pure. It dissolves with a deep yellow coloration in dilute sodium carbonate solution and no longer reacts with nitrous acid.

In an analogous manner proceeds the manufacture of the condensation product from 4-acetoxy-3-nitrobenzoyl chloride and 2-hydroxy-3-nitro-5-aminobenzoic acid. A yellowish brown powder is obtained, which dissolves readily in water in the presence of sodium carbonate and is indifferent towards nitrous acid.

When it is intended to condense an amino compound, which is insoluble in sodium carbonate, with a 4-acyloxy-3-nitrobenzoyl halide an organic solvent is with advantage employed for the process. For example, the compound of the constitution:

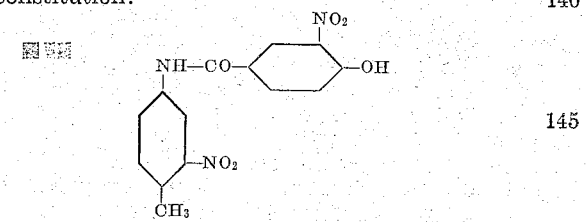

can be produced in the following manner:

15.2 parts of 2-nitro-4-toluidine are dissolved in 400 parts of dry benzene, 10 parts of pyridine are added to combine with the hydrogen chloride formed during the reaction and a solution of 24.3 parts of 4-acetoxy-3-nitrobenzoyl chloride in 100 parts of benzene is slowly dropped in at 5–10° C. with good stirring. As soon as this addition is complete heating is slowly effected at 60° C. A heavy brown oil thus separates, from which on cooling of the reaction mixture the benzene is separated. The oil obtained is triturated with methyl alcohol, in which it is partly soluble. After evaporation of the resulting suspension the desired condensation product is obtained as a fine powder, which can be recrystallized from xylene. It forms long, greenish yellow needles, which melt at 221–222° C.

Instead of pyridine other tertiary bases, such as dimethylaniline, can likewise be employed as acid binding agents.

*Example 4.*—18.0 parts of 1-oxalylamino-3-amino-benzene are dissolved in 800 parts of cold water to a neutral solution by the addition of sodium carbonate and 30 parts of crystalline sodium acetate added to the solution thus prepared. The solution is heated to 40° C. and 24.3 parts of 4-acetoxy-3-nitrobenzoyl chloride are then introduced in one portion with brisk stirring. The latter completely disappears in the course of a quarter of an hour and a clear solution is produced, from which microscopic, pale yellow needles separate after standing for 12 hours; these dissolve in sodium carbonate solution with a yellow coloration and cannot be diazotized. The splitting off of the oxalyl residue takes place readily with alkaline agents according to the customary processes, when a diazotizable compound is obtained, which couples with R-salt to a readily soluble yellowish red azo dyestuff. By reduction of the amino-nitro compound thus obtained, a compound results of the constitution:

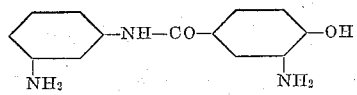

which is readily soluble in acids and can be tetrazotized.

*Example 5.*—A solution of 35.9 parts of pure, crystalline sodium sulfide in 40 parts of water is dropped at 30° C. with good stirring into a suspension of 43.8 parts of the compound of the formula:

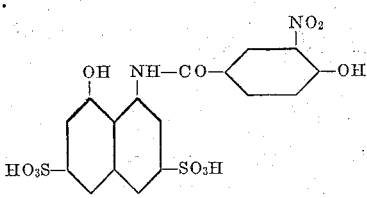

(described in Example 2) in 200 parts of water, to which have been added 10 parts of an aqueous caustic soda lye of 30% strength. As soon as all the solution has been added, heating is effected to 60° C. and it is maintained for some time at this temperature. On cooling and after acidifying, a thick magma is formed, which is filtered by suction and taken up in dilute sodium carbonate solution. The sulfur suspended in the solution is filtered off. The clear filtrate is acidified and the desired reduction product is thus obtained as a thick magma, which is filtered by suction and dried. The new compound reacts with nitrous acid to give a yellow colored solution.

*Example 6.*—10 parts of the sodium salt of the condensation product obtainable according to Example 2 from 3-nitro-4-acetoxybenzoyl chloride and 2-amino-5-hydroxynaphthalene-7-sulfonic acid are dissolved in 400 parts of hot water. After the addition of 10 parts of an aqueous acetic acid of 30% strength 20 parts of iron filings are added to the boiling solution, which is kept boiling for a further short time. The reduction is completed very quickly; the end point is ascertained when on spotting a test portion on filter paper with sodium carbonate solution a yellow coloration no longer appears. A solution of 5 parts of sodium carbonate is now added and the mixture filtered by suction. The 2-(3'-amino-4'-hydroxybenzoylamino)-5-hydroxynaphthalene-7-sulfonic acid is separated quantitatively from the cooled, slightly brownish filtrate by the addition of sodium chloride and hydrochloric acid. After the customary working up the new compound is obtained as a slightly brownish powder; it forms a yellowish brown colored diazo compound.

In a similar manner, as described in the above examples, compounds containing any other desired primary or secondary amino groups, which, moreover, likewise contain groups capable of azo dyestuff formation or residues convertible into such groups, can be caused to react with 3-nitro-4-acyloxybenzoic acid halides and the intermediate products thus obtained then subjected to the action of reducing agents.

*Example 7.*—15.3 parts of 5-amino-2-hydroxybenzoic acid are dissolved in 500 parts of water with the addition of sodium carbonate to form a neutral solution. To this are added 30 parts of crystallized sodium acetate and with brisk stirring and heating to 50° C. 24.3 parts of 3-nitro-4-acet-hydroxy-benzoyl-chloride are introduced into the solution. After heating for a short time to 65° C. the reaction is complete, this being recognized when the solution obtained no longer reacts with nitrous acid. The liquid is allowed to cool and the reaction product is precipitated with dilute hydrochloric acid. After working up in the customary manner, it is obtained in the form of a weakly greenish colored powder, which dissolves in dilute sodium carbonate solution with a deep yellow coloration and cannot be diazotized. The new compound corresponds to the formula:

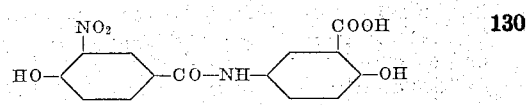

In an analogous manner condensation products possessing similar properties are obtained by employing instead of 5-amino-2-hydroxybenzoic acid the 5-amino-3-methyl-2-hydroxybenzoic acid, 3-sulfonic-acid-5-amino-2-hydroxy benzoic acid or 5-(4'-aminobenzoyl)-amino-3-sulfonic acid-2-hydroxybenzoic acid with 3-nitro-4-acethydroxybenzoyl chloride or other 3-nitro-4-acylhydroxy-benzoic acid halides.

Condensation products of this kind are converted by reduction into valuable diazotizing components; for example, 31 parts of the condensation product produced according to the example from 5-amino-2-hydroxybenzoic acid and 4-acethydroxy-3-nitrobenzoyl chloride are dissolved in 1200 parts of hot water with the addition of sodium carbonate to form a neutral solution. The solution is boiled, 30 parts of 30% acetic acid are added, then 60 parts of iron filings are introduced and the liquid is heated for a short time at the boiling point. The reaction is very quickly complete, which can readily be recognized when a test portion removed on filter paper no longer changes towards yellow on contact with sodium carbonate solution; 20 parts of sodium carbonate are now added and after once again boiling and filtering by suction the reaction product can readily be separated from the weakly reddish colored filtrate by acidification and salting out. In the dry state it is an almost colorless powder, difficultly soluble in water and forms a yellow diazo compound, which dissolves with difficulty.

In an analogous manner all the other condensation products produced from substituted amino-o-hydroxybenzoic acids and 3-nitro-4-acylhydroxybenzoyl chlorides, mentioned in the example, can be converted into the corresponding amino compounds.

*Example 8.*—25.7 parts of the azo dyestuff 4-amino-4'-hydroxy azo benzene-3'-carboxylic acid are dissolved to a neutral solution in 700 parts of water with the addition of sodium carbonate, 30 parts of crystallized sodium acetate are added and 24.3 parts of 4-acetoxy-3-nitrobenzoyl chloride are introduced quickly with vigorous stirring into the solution heated to a temperature of 55° C.

The reaction begins immediately and the reaction product separates in a pure form as a yellowish brown precipitate. 10 parts of this are dissolved in 300 parts of water by means of 2 parts of sodium carbonate and heated to 40° C. To this is added a concentrated solution of 20 parts of crystallized sodium sulfide and the whole is further heated quickly to 90° C. and stirred for half an hour longer at this temperature. After cooling the solution is acidified with dilute hydrochloric acid, the precipitate produced is filtered off with suction and dissolved in dilute sodium carbonate solution. The sulfur suspended in the solution is removed by filtration and the light yellow reaction product is separated from the filtrate by means of sodium chloride, filtered and dried. Thus is obtained 4-(3''-amino-4''-hydroxybenzoyl)-amino-4'-hydroxyazobenzene-3'-carboxylic acid.

In an analogous manner other aminoazo compounds, for example, that from diazotized 2-amino-naphthalene-4.8-disulfonic acid and 2-amino-1.4-dimethylbenzene can also be caused to react with 3-nitro-4-acetoxybenzoyl chloride or other 3-nitro-4-acyl-hydroxybenzoic acid halides and the o-nitro-hydroxy compounds produced be reduced to the corresponding o-amino-hydroxy compounds.

We claim:

1. As new products compounds of the probable general formula:

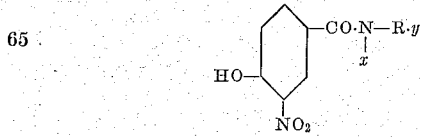

wherein $x$ stands for hydrogen or an alkyl group, R stands for an aromatic nucleus, $y$ stands for an amino-, nitro-, hydroxy-group or for the group $-N=N \cdot R_1$, $R_1$ meaning an aromatic nucleus, and wherein all nuclei may be further substituted by substituents selected from the group consisting of alkyl, alkoxy, hydroxyl, the nitro-, amino-, sulfonic acid- and carboxylic acid group, being generally colorless to greenish to brown crystalline substances and being valuable intermediate products in the manufacture of dyestuffs.

2. As new products compounds of the probable general formula:

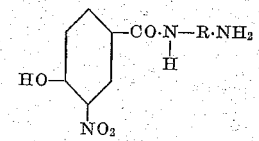

wherein R stands for an aromatic nucleus, and wherein all nuclei may be further substituted by substituents selected from the group consisting of alkyl, alkoxy, hydroxyl, the nitro-, amino-, sulfonic acid- and carboxylic acid group being generally colorless to greenish to brown crystalline substances and being valuable intermediate products in the manufacture of dyestuffs.

3. As a new product the compound of the following formula:

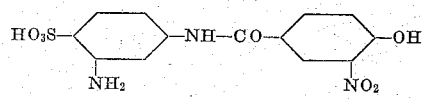

being an almost colorless powder which dissolves in sodium carbonate solution with a deep yellow coloration and being capable of being diazotized.

4. As a new product the compound of the following formula:

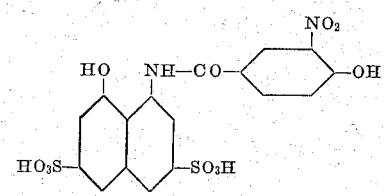

being a yellow powder and being a valuable intermediate product in the manufacture of dyestuffs.

5. As a new product the compound of the following formula:

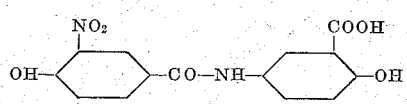

being a weakly greenish colored powder and being a valuable intermediate product in the manufacture of dyestuffs.

WINFRID HENTRICH.
RICHARD STROEBEL.
ERNST TIETZE.